Sept. 11, 1945.  H. E. CARNAGUA ET AL  2,384,439
TRANSMISSION
Filed June 26, 1943
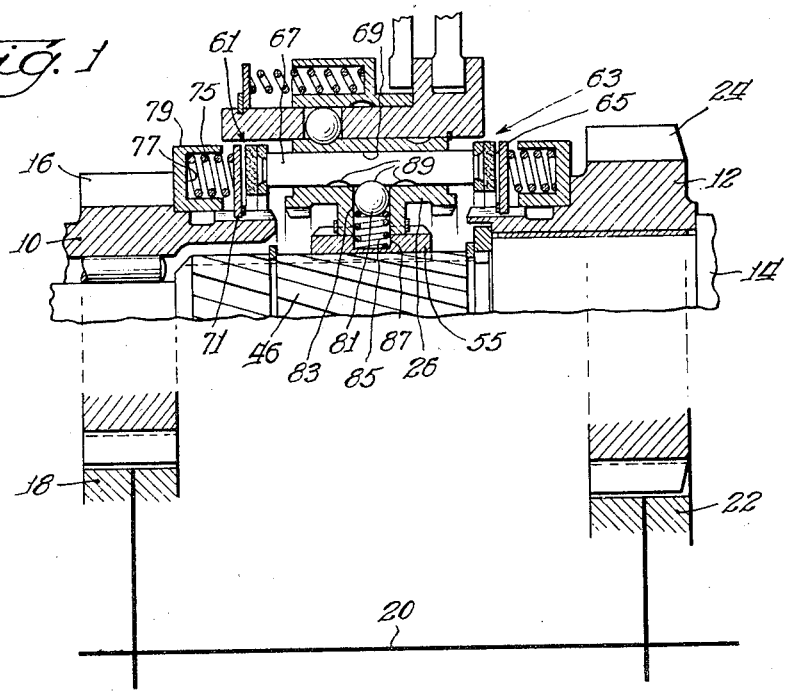
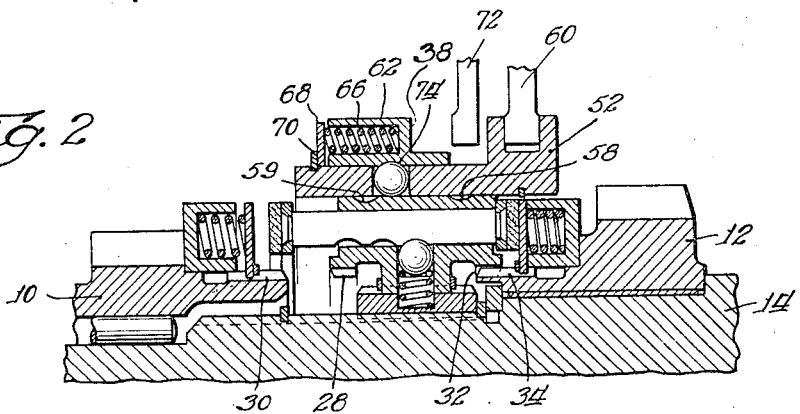
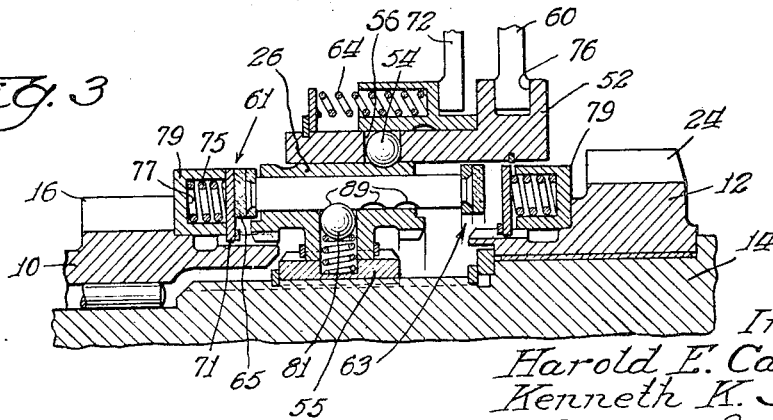
Inventors:
Harold E. Carnagua
Kenneth K. Stough
By: Edward C. Gritzbaugh
Atty.

Patented Sept. 11, 1945

2,384,439

UNITED STATES PATENT OFFICE 2,384,439

TRANSMISSION

Harold E. Carnagua and Kenneth K. Stough, Muncie, Ind., assignors to Borg-Warner Corporation, Chicago, Ill., a corporation of Illinois Application June 26, 1943, Serial No. 492,377

8 Claims. (Cl. 192—53)

Our invention relates to positive coupling devices of the type shown in application Serial No. 492,374, filed simultaneously herewith in the name of Harold E. Carnagua and John M. Simpson for United States Letters Patent on a coupling device, adapted to be employed, in connection with suitable controls, for effecting an automatic shift between two of the gear ratios of a transmission in which the gearing may be generally of a conventional type and in which other shifts may be operator energized. The general object of our invention is to provide a coupling of this type which is adapted to utilize a friction type of synchronizing means.

More specifically, the invention contemplates a positive clutch mechanism which is adaptable to an arrangement, in a motor vehicle transmission, wherein the shift from a lower ratio such as second speed to a higher ratio such as direct drive is effected automatically in response to a decelerating torque load transmitted from the lower ratio driving member to the clutch mechanism, and wherein the downshift from the higher ratio to the lower ratio may be effected by the torque responsive means under the control of the operator in moving the engine throttle control in throttle opening direction, the clutch mechanism being automatically locked in the higher ratio position by locking means which is adapted to be unlocked in conjunction with establishing (as by opening the engine throttle) a forward driving torque on the torque responsive mechanism by which the clutch means is shifted away from the higher ratio position. One of the objects of the invention is to provide, in such a clutch mechanism, an arrangement wherein the torque responsive mechanism energizes both a frictional synchronizing mechanism and a positive clutch means.

A further object of the invention is to provide a positive coupling mechanism embodying torque responsive means which is adapted to energize first a frictional synchronizing mechanism and then a positive coupling mechanism. To this end, the invention provides an arrangement wherein torque responsive thrust is applied directly to the shiftable positive clutch member and from the latter is transmitted through yieldable thrust transmitting means to the friction synchronizing mechanism.

These and other objects and features of this invention will become apparent from the following specification when taken together with the accompanying drawing in which:

Fig. 1 is an axial section view of a transmission embodying the invention, shown in the neutral position;

Fig. 2 is an axial section view of the same shown in the second speed drive position; and Fig. 3 is an axial section view of the same shown in the direct drive position.

As an example of one form in which the invention may be embodied, we have shown in the drawing a gearing arrangement corresponding in general to a conventional three speed manually shifted automobile transmission including a direct drive member 10 adapted to transmit a reduced drive to a second speed drive member 12 through the medium of gear teeth 16 formed on the direct drive member 10 a gear 18 meshing with the gear teeth 16 and forming part of a countershaft gear cluster 20 (shown schematically), a gear 22 also forming part of the gear cluster 20, and gear teeth 24 on the second speed member 12, meshing with the gear 22. The drive is adapted to be transmitted to a driven shaft 14, either in direct ratio from the direct drive member 10 or at a reduced ratio from the second speed drive member 12, through a shiftable jaw clutch member 26 having teeth 28 adapted to mesh with clutch teeth 30 on the direct drive member 10 and teeth 32 adapted to mesh with clutch teeth 34 on the second speed drive member 12.

The jaw clutch member 26, which is of annular form, encircles and is splined to a hub member 55 which in turn is connected to the driven shaft 14 by a helically splined connection 46, the direction of the spline 46 being such as to urge the clutch member 26 toward the direct drive member 10 when a deceleration load is applied to the clutch member 26 from one of the driving members 10 or 12 and the driven shaft 14 is driven forwardly under a coast torque, and to urge the clutch member 26 toward the second speed member 12 when a forward driving torque is applied to the member 26 from one of the driving members.

For manually shifting the clutch member 26 from the neutral position to one of the drive positions (normally the second speed position) we provide a shift sleeve 52 which is axially shiftable on the cylindrical periphery of the clutch member 26 and is adapted to be locked to the clutch member 26 by locking balls 54 caged in openings 56 in the shift sleeve 52 and adapted to be forced by a locking ring 62 into an annular groove 58 or an annular groove 59 in the periphery of the clutch element 26. A manually operated shift yoke 60 engages in an annular channel 76 in the shift sleeve 52 for transmitting manual shifting movement to the sleeve. Locking ring 62 is constantly biased toward its locking position (shown in Fig. 3) determined by engagement against the collar 76, by coil springs 64 caged in bores 66 in the locking ring 62 and compressed between the bottoms of the bores 66 and a washer 68 encircling the shift sleeve 52 and abutted against a snap ring 70 mounted in the sleeve 52. From this locking position the ring 62 is adapted to move toward the washer 68 to its unlocking position shown in Fig. 2, wherein an annular groove 74 in its inner-surface registers with the locking balls 54 and permits the latter to move out of the groove 58 or 59. The ring 62 is adapted to be moved to this position against the compression of the springs 64 by a shift yoke 72 adapted to engage a shoulder 38 on the ring 62.

The shift yoke 72 is adapted to be operated by means coordinated with the engine throttle of the vehicle in which the transmission is embodied, so that the locking ring 62 may be moved to its unlocking position in conjunction with throttle opening movement such as for example a movement beyond full throttle position.

A suitable arrangement of control mechanism is described in the companion application Serial No. 492,376 filed simultaneously herewith, in the name of Harold E. Carnagua and Maurice N. Bareham for "Transmission."

For synchronizing the clutch member 26 to the member toward which it is being shifted, we provide friction synchronizers 61 and 63 respectively, comprising friction facings 65 carried by a series of thrust rods 67 mounted in bores 69 in the jaw member 26, and coacting friction rings 71 splined to the respective driving teeth 30 and 34. Coil springs 75 mounted in bores 77 in rings 79 on the driving members 10 and 12 respectively form yielding abutments for the rings 71. Poppet balls 81 mounted in bores 83 in the jaw member 26 are urged outwardly by springs 85 seated in sockets 87 in the hub member 55, into engagement with one of three series of recesses 89 in the respective thrust rods 67.

In the neutral position of the synchronizer, which is conventionally intermediate the two driving positions, the poppet balls 81 engage the intermediate recess 89 as shown in Fig. 1. In shifting from neutral to second speed ratio, the shift yoke 60 is moved to the right, manual pressure being transmitted from the yoke 60 through the shift sleeve 52, the locking balls 54 (engaged in groove 59) and the jaw member 26 and poppet balls 81 to the thrust rods 67, bringing the friction ring 65 of the synchronizer 63 into engagement with the friction ring 71 thereof and forcibly synchronizing the speed of the driving member 12 with that of the jaw member 26 and driven shaft 14. The clutch teeth 32 may then mesh with the clutch teeth 34. As the clutch teeth move into meshing engagement, the poppet balls 81 will be forced out of the central recesses 89 and into the right hand series of recesses 89. The engagement of the poppet balls 81 in the right hand recesses 89 will yieldably latch the thrust rods 67 to the clutch member 26 in the relative positions shown in Fig. 2, and these relative positions will be maintained until direct drive is established.

As the shift fork 60 is being moved to the right, the fork 72 will be held, by suitable means, in the position shown in Fig. 1. The collar 62 will engage the lever 72 and be stopped thereby, while the shifting movement of the sleeve 52 continues (resulting in the springs 64 being compressed) until the groove 74 in the ring 62 registers with the locking balls 54 and permits the latter to move out of the groove 59 in the clutch member 26. After the sleeve 52 is unlocked from the clutch member 26, its movement to the right is continued until it reaches a position in which the locking balls 54 are engaged against the cylindrical periphery of the clutch member 26 and thus locked in engagement with the groove 74 of the locking ring. This locks the locking ring to the shift sleeve 52 with the springs 64 urging it toward the right. The shift fork 72 is then moved, by suitable linkage with the fork 60, to the position shown in Fig. 2, while the sleeve 52 is completing its movement to the second speed position shown in Fig. 2. The transmission is now in second speed ratio and power is transmitted through the countershaft and the second speed drive member 12 to the clutch member 26 and thus to the driven shaft 14.

The shift fork 60 is then locked in its position shown in Figs. 2 and 3, and thus functions to hold the shift sleeve in proper position for subsequently assisting in locking the clutch member 26 in the direct drive position, as will presently be explained.

The shift from second speed to direct drive is accomplished automatically in response to deceleration of the driving member 12, the coast torque on the driven member 14 reacting through the helically splined connection 46 against the clutch member 26, and the deceleration loads, transmitted to the clutch member 26 first by the second speed drive member 12 and subsequently by the second speed direct drive member 10, combining to produce a torque reaction in the helically splined connection 46 which moves the clutch member 26 from the second speed to the direct drive position. Since the direct drive synchronizer facing 65 is carried in a position shifted to the left with reference to the clutch member 26, it will engage its coacting facing 71 before the clutch teeth 32 become disengaged from the clutch teeth 34 of the second speed member, and thus there will be a continuous transmission of deceleration load from the driving members to the clutch member 26. The provision of the arrangement wherein the thrust rods 67 may be latched in three different positions relative to the clutch member 26 thus makes it possible for both synchronizers to be disengaged simultaneously for the neutral position shown in Fig. 1, while provision is made for continuity of torque transmission from the driving members to the clutch member 26 in the torque responsive shift.

Upon engagement of the facing 71 of the direct drive synchronizer 61 the latter will be moved to the left, compressing the springs 75 until it engages the spring cage member 79 and the poppet balls 81 will then be forced out of the right hand recesses 89 and into the intermediate recesses 89. At the same time, the synchronizer 61 will be synchronizing the clutch member 26 with the driving member 10 under the torque reactive pressure transmitted from the clutch member 26 through the poppet balls 81 and recesses 89 and thrust rods 67, and when synchronization has been effected, the clutch member 26 will shift on into clutching engagement with the direct drive clutch teeth 30 in the direct drive position shown in Fig. 3.

As the clutch member 26 moves to the left, the shift sleeve 52 will be restrained by the shift yoke 60, which is locked in a fixed position as stated above, and when the clutch member 26 reaches the direct drive position the locking balls 54 will engage in the groove 58 of the clutch member 26, being forced therein by the camming action of the locking ring 62 under the constant biasing of the springs 64. This frees the locking ring 62 for axial movement and it will move to the right under the bias of the springs 64 until stopped by the collar 52, and in this position, shown in Fig. 3, it locks the balls 54 in the groove 58. Thus the clutch member 26 is locked to the shift sleeve 52 which in turn is locked in a fixed position as stated above, and the clutch mechanism is therefore locked in the direct drive position.

The clutch mechanism may be downshifted to the second speed position while the shift sleeve 52 still remains locked in the Fig. 3 position. This is accomplished by accelerating the driving members 10 and 12 and shifting the fork 72 to the left against the compression of the springs 64 until the groove 74 registers with the locking balls 54, whereupon the clutch member 26 will be unlocked from the shift sleeve 52 and will, under the torque reaction established by the acceleration of the driving members, (transmitted to the clutch member 26 first through the clutch teeth 30, 28 and subsequently through the synchronizer 63) shift from the direct drive to the second speed position. During the early stages of this shift the friction facing 65 of the synchronizer 63 will be carried in a position shifted to the right relative to the clutch member 26, with the poppet balls 81 in the left hand series of recesses 89, this position having been established at the completion of the shift from second speed to direct drive. In this position, the synchronizer 63 will engage before the clutch teeth 30, 28 disengage, thus providing a continuous drive from the driving members to the clutch member 26 during the shift. At the completion of the shift, the parts will again be in the position shown in Fig. 2.

Return to the neutral position from second speed is accomplished by unlocking the shift fork 60 and manually shifting the sleeve 52 to the left, first registering the locking balls 54 with the groove 59 and locking the sleeve 52 to the hub 26, (by the spring energized shift of the locking ring 62 to the right) and then moving the hub 26 to the left with the sleeve 52 until the neutral position of Fig. 1 is reached.

While we have disclosed our invention in connection with certain specific embodiments thereof, it is to be understood that these are by way of example rather than limitation, and it is intended that the invention be defined by the appended claims which should be given a scope as broad as consistent with the prior art.

We claim:

1. In a coupling, in combination with a pair of members, one rotatable with reference to the other, a coupling element adapted for positive coupling connection with one of said members and having a driving connection with the other member permitting it to shift axially to establish said coupling connection, means for locking said coupling element in said coupling connection and including a movable locking element having an unlocking and a locking position, means constantly biasing said locking element toward its locking position, synchronizing means comprising coacting friction devices having driving connections with the respective members, adapted under axial pressure from said coupling element when the latter is being shifted toward the coupling position, to synchronize said members, and operator controlled means for moving said locking element to its unlocking position wherein said coupling element is released for uncoupling movement.

2. In a coupling, in combination with a pair of members, one rotatable with reference to the other, a coupling element adapted for positive coupling connection with one of said members, a torque responsive driving connection between said coupling element and the other member adapted, under torque transmission in one direction between said members, to shift said coupling element axially to establish said coupling connection and in response to torque transmission between said members in the opposite direction to uncouple said connection, means for locking said coupling element in said coupling connection and including a movable locking element having an unlocking and a locking position, means constantly biasing said locking element toward its locking position, synchronizing means comprising coacting friction devices having driving connection with the respective members, adapted under axial pressure from said coupling element when the latter is being shifted toward the coupling position, to synchronize said members, and operator controlled means for moving said locking element to its unlocking position wherein said coupling element is released for uncoupling movement.

3. A coupling as defined in claim 2, including operator controlled means for shifting said coupling element from a neutral, non-driving position to a position from which it may move torque responsively.

4. In a transmission, in combination with a pair of torque transmitting members arranged to rotate at different speeds, shiftable clutch means adapted for clutching connection with either of said pair of members, means energized by transmission of torque in one direction between said torque transmitting members and said shiftable clutch means for shifting said clutch means to a position clutched to one of said members and, energized by transmission of torque between said members and said clutch means in the opposite direction for unclutching the clutch means from said one member, locking means effective to lock said clutch means in said clutched position and including a movable locking element having an unlocking and a locking position, means constantly biasing said locking element toward its locking position, synchronizing means comprising coacting friction devices having driving connections with the respective members and with said clutch means, adapted under axial pressure from said clutch means when the latter is being shifted toward its clutching position, to synchronize the clutch means with the member toward which it is being shifted, and operator controlled means for moving said locking element to unlocking position wherein said clutch means is released for unclutching movement.

5. A transmission as defined in claim 4, including operator controlled means for moving said clutch means from a neutral, non-driving position to its other clutched position, from which it may move torque responsively.

6. In a synchronizer, in combination with a pair of axially opposed torque transmitting members, shiftable positive clutch means adapted for positive clutching connection with either of said pair of members, means responsive to transmission of torque between said members and said clutch means in one direction for shifting said clutch means into clutching connection with one of said members, and responsive to torque transmission in the opposite direction between said members and said clutch means to shift said clutch means into clutching connection with the other of said pair of members, and means for synchronizing said clutch means with the clutch member toward which it is being shifted, comprising thrust transmitting means carried by said clutch means and axially shiftable relative thereto, friction elements carried by the respective axial extremities of said thrust transmitting means, friction elements drivingly connected to the respective clutch members and adapted to be engaged by said thrust member carried friction elements, and means adapted to establish a yielding thrust transmitting connection between said thrust means and said clutch means in either of three axially spaced positions, the thrust member carried friction element being carried in axially advanced positions relative to the clutch means when in the outer of said three positions so as to establish contact with their coacting clutch members while positive clutching engagement is maintained with the opposite clutch members, and being adapted to be both disconnected from their respective friction clutch elements while the clutch means is unclutched from the positive clutch means of both clutch members, in the intermediate of said three positions.

7. In a synchronizing positive coupling, in combination with a pair of members one of which is rotatable relative to the other and a third member, means for selectively coupling said third member to either of said pair of members comprising a coupling member having an axially shiftable torque transmitting connection with said third member and adapted to establish positive coupling connection with either of said pair of members, and synchronizing means comprising thrust means carried by said positive coupling member, friction members carried by the respective axial extremities of said thrust means, coacting friction elements drivingly connected to the respective members of said pairs and adapted to be selectively engaged by said friction members, and means for yieldably connecting said thrust means to said coupling member in either of three axially spaced positions in each of the outer of which the thrust means carried friction member on the disconnected side of the coupling member is carried in an axially advanced position, relative to said coupling member so as to establish contact with its coacting friction element prior to release of the existing positive coupling connection.

8. A synchronizing coupling as defined in claim 7, wherein said thrust means comprises a plurality of rods extending through axial bores in said coupling member and each provided with three axially spaced recesses, and wherein said yielding thrust connection comprises poppet balls yieldingly urged into engagement with said recesses.

HAROLD E. CARNAGUA.
KENNETH K. STOUGH.